(12) United States Patent
Shin et al.

(10) Patent No.: US 9,954,986 B2
(45) Date of Patent: Apr. 24, 2018

(54) MOBILE DEVICE

(71) Applicant: LG ELECTRONICS INC., Seoul (KR)

(72) Inventors: Choonghwan Shin, Seoul (KR); Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/503,953

(22) PCT Filed: Aug. 26, 2014

(86) PCT No.: PCT/KR2014/007952
§ 371 (c)(1),
(2) Date: Feb. 14, 2017

(87) PCT Pub. No.: WO2016/024656
PCT Pub. Date: Feb. 18, 2016

(65) Prior Publication Data
US 2017/0279942 A1    Sep. 28, 2017

(30) Foreign Application Priority Data

Aug. 14, 2014 (KR) .................. 10-2014-0106201

(51) Int. Cl.
*H04M 1/00* (2006.01)
*H04M 1/02* (2006.01)

(52) U.S. Cl.
CPC .......... *H04M 1/0243* (2013.01); *H04M 1/026* (2013.01); *H04M 1/0268* (2013.01);
(Continued)

(58) Field of Classification Search
CPC .. H04M 1/0206; H04M 1/0208; H04M 1/021; H04M 1/0214; H04M 1/0216;
(Continued)

(56) References Cited

U.S. PATENT DOCUMENTS

2005/0141703 A1*  6/2005  Hickey ............... H04M 1/0212
                                                    379/433.13
2008/0300031 A1* 12/2008  Cho .................... H04M 1/0216
                                                    455/575.3
(Continued)

FOREIGN PATENT DOCUMENTS

KR   10-2008-0108842 A   12/2008
KR   10-2009-0054848 A    6/2009
(Continued)

*Primary Examiner* — Duc M Nguyen
(74) *Attorney, Agent, or Firm* — Birch, Stewart, Kolasch & Birch, LLP

(57) ABSTRACT

The present invention relates to a mobile device. A mobile device, according to an embodiment, comprises: a first main body which has a display unit having an image output on one side thereof; a second main body which is positioned at a predetermined distance away from the first main body and has a substrate unit, inside which an electronic component is mounted, and a power source battery for supplying a power source; and a connecting member which electrically connects the first main body and the second main body on the lower ends of the first main body and the second main body. The connecting member comprises: a body portion which forms the external shape; a mounting portion which is provided on the upper side of the body portion and has the first main body and the second main body placed thereon; a flexible substrate which is placed on the inside of the body portion and electrically connects the first main body and the second main body; and terminals which are formed on both end portions of the flexible substrate, are externally protruded from the mounting portion, and which are coupled to the first main body and the second main body, respectively.

14 Claims, 23 Drawing Sheets

(52) U.S. Cl.
CPC .... *H04M 2201/38* (2013.01); *H04M 2250/12* (2013.01); *H04M 2250/16* (2013.01); *H04M 2250/22* (2013.01); *H04M 2250/52* (2013.01)

(58) Field of Classification Search
CPC .. H04M 1/0218; H04M 1/022; H04M 1/0222; H04M 1/0241; H04M 1/0245; H04M 1/0247; H04M 1/0262; H04M 1/0264; H04M 1/027; H04M 1/0274
See application file for complete search history.

(56) References Cited

U.S. PATENT DOCUMENTS

| | | | | |
|---|---|---|---|---|
| 2009/0075692 | A1* | 3/2009 | Park | H04M 1/0233 |
| | | | | 455/556.1 |
| 2009/0104949 | A1* | 4/2009 | Sato | H04M 1/0214 |
| | | | | 455/575.3 |
| 2009/0126155 | A1* | 5/2009 | Nieuwenhuizen | H04M 1/0216 |
| | | | | 16/302 |
| 2009/0325654 | A1* | 12/2009 | Shi | H04M 1/0227 |
| | | | | 455/575.3 |
| 2012/0014054 | A1* | 1/2012 | Ashcraft | G06F 1/1626 |
| | | | | 361/679.26 |
| 2012/0033354 | A1* | 2/2012 | Huang | G09F 9/33 |
| | | | | 361/679.01 |
| 2013/0084919 | A1* | 4/2013 | Glynn | H01M 10/465 |
| | | | | 455/566 |
| 2013/0151196 | A1* | 6/2013 | Yuen | A61B 5/0002 |
| | | | | 702/160 |
| 2014/0101575 | A1* | 4/2014 | Kwak | G06F 1/1616 |
| | | | | 715/761 |
| 2015/0237192 | A1 | 8/2015 | Kim et al. | |
| 2016/0116944 | A1* | 4/2016 | Lee | H04M 1/022 |
| | | | | 361/679.26 |
| 2016/0308572 | A1* | 10/2016 | Shin | H04B 1/3888 |

FOREIGN PATENT DOCUMENTS

| | | |
|---|---|---|
| KR | 10-2010-0116397 A | 11/2010 |
| KR | 20-2012-0001015 U | 2/2012 |
| KR | 10-2014-0038583 A | 3/2014 |
| KR | 10-2014-0077807 A | 6/2014 |

* cited by examiner

MOBILE DEVICE

CROSS REFERENCE TO RELATED APPLICATIONS

This application is the National Phase of PCT International Application No. PCT/KR2014/007952, filed on Aug. 26, 2014, which claims priority under 35 U.S.C. 119(a) to Patent Application No. 10-2014-0106201, filed in Republic of Korea on Aug. 14, 2014, all of which are hereby expressly incorporated by reference into the present application.

TECHNICAL FIELD

The present invention relates to a mobile device.

BACKGROUND ART

A terminal may be classified into a mobile device (mobile/portable terminal) and a fixed terminal (stationary terminal) according to whether it may move. Further, the mobile device may be classified into a portable terminal (handheld terminal) and a holdable terminal (vehicle mounted terminal).

Functions of the mobile device are being diversified. For example, the functions include data and voice communication, picture shooting and video shooting through a camera, voice recording, reproduction of a music file through a speaker system and outputting of an image or a video to a display unit. Some terminals have an electronic game playing function added thereto or perform a multimedia player function. In particular, recent mobile devices may receive multi-cast signals that provide visual contents such as broadcasting, video and a television program.

Such a terminal has the diversified functions, and thus is implemented in a form of a multimedia player having complex functions including, for example, shooting of a picture or a video, reproduction of a music file or a video file, a game, reception of broadcasting or the like.

Further, as the mobile device is considered as a personal portable item for representing personality of a user, various design forms thereof are required. The design forms include structural changes and modifications for allowing the user to more easily use the mobile device.

Modifying a structural portion of the terminal may be considered to support and increase the functions of the terminal.

In a mobile device according to the related art, a body in which electronic elements such as a display unit that outputs an image, a printed circuit board and a battery are provided is a single case, and thus, a design change of the mobile device is restrained. Further, because various configurations should be arranged inside the single case, it is difficult to design an inner structure of the mobile device.

DISCLOSURE

Technical Problem

The present invention is conceived to improve the above problems, and an aspect of the present invention is to provide a mobile device in which a first body that outputs an image and a second body in which electronic elements are provided are separately coupled to each other.

Technical Solution

To achieve the above aspect or other aspects, provided is a mobile device including: a first body having a display unit through which an image is output to one surface of the display unit; a second body spaced apart from the first body by a predetermined interval such that a substrate part, on which electronic elements are mounted, and a power source battery configured to supply electric power are provided in the second body; and a connection member formed at lower ends of the first body and the second body to electrically connect the first body and the second body to each other, wherein the connection member comprises: a body defining an outer appearance; installation parts provided on an upper surface of the body such that the first body and the second body are positioned on the installation parts, respectively; a flexible substrate arranged inside the body to electrically connect the first body and the second body to each other; and terminals formed at opposite ends of the flexible substrate, protruding toward outsides of the installation parts, and coupled to the first body and the second body, respectively.

Further, the body may be flexible such that the first body and the second body are movable in a direction in which they cross each other or in a direction in which they are parallel to each other.

Further, the mobile device may further include a button part provided on a rear surface of the first body, which faces the second body, to receive a push input.

Further, the mobile device may further include an auxiliary display unit formed on a front surface of the second body, which faces the rear surface of the first body, to output an image.

Further, the mobile device may further include a first camera mounted on one side edge of the auxiliary display unit.

Further, the mobile device may further include a first detection sensor provided at any one of a left edge and a right edge of the second body, and a second detection sensor provided at the other one of the left edge and the right edge of the second body, wherein a leftward movement or a rightward movement of the first body is detected by the first detection sensor and the second detection sensor.

Further, when the first camera is in a shooting mode, a distance between the mobile device and a subject may be detected by a detection sensor, which is closer to the first camera, among the first detection sensor and the second detection sensor.

Further, the mobile device may further include a second camera provided on a rear surface of the second body to perform a shooting operation.

Further, the mobile device may further include an auxiliary module mounted on a space formed between the first body and the second body.

Further, the auxiliary module may be an electronic element installed in any one or both of the first body and the second body, and may include a battery configured to supply electric power.

Further, the auxiliary module may include a speaker configured to output sounds transferred from any one or both of the first body and the second body.

Further, the auxiliary module may include: an insertion groove formed on one surface of the battery such that the button part is inserted into the insertion groove; connection terminals provided at any point spaced apart from the insertion groove and electrically connected to the first body; and clips provided on the rear surface of the first body, which corresponds to locations of the connection terminals, to allow a current charged in the battery to be supplied to the first body by a contact with the connection terminals.

Further, the auxiliary module may be a magnetic member having a magnet therein, magnetic bodies may be mounted in the first body and the second body, and a state in which the first body and the second body are in close contact with the auxiliary module may be maintained by an interaction between the magnetic bodies and the magnetic member.

Further, the mobile device may further include: a plurality of catching protrusions protruding from upper surfaces of the installation parts, and a plurality of catching grooves formed on bottom surfaces of the first body and the second body such that the plurality of catching protrusions are inserted into the plurality of catching grooves.

Further, when the first body is relatively moved to a left side or a right side of the second body, a shooting mode may be executed while the camera is exposed.

Further, when the first body is relatively moved to the left side of the second body, a cursor for selecting an icon displayed on the display unit may be moved to the left side, and when the first body is relatively moved to the right side of the second body, the cursor for selecting an icon may be moved to the right side.

Further, when the first body is relatively moved to the left side of the second body, a screen displayed on the display unit may be enlarged, and when the first body is relatively moved to the right side of the second body, the screen displayed on the display unit may be reduced.

Advantageous Effects

A mobile device according to the present invention has the following effects.

First, a first body through which an image is output and a second body having electronic elements therein are separately coupled to each other, so that convenience of a user is ensured.

Second, a connection member connecting the first body and the second body to each other is manufactured of a flexible material, so that the first body and the second body may be manipulated to have various angles.

Third, a button part is provided on a rear surface of the first body, so that manipulation of the mobile device becomes simple and convenient.

Fourth, various operation modes may be implemented as an operation of moving the first body and the second body by the user.

Fifth, an auxiliary module is mounted on a space defined by the first body and the second body, so that various functions may be implemented.

BEST MODE FOR THE INVENTION

Figure 1:
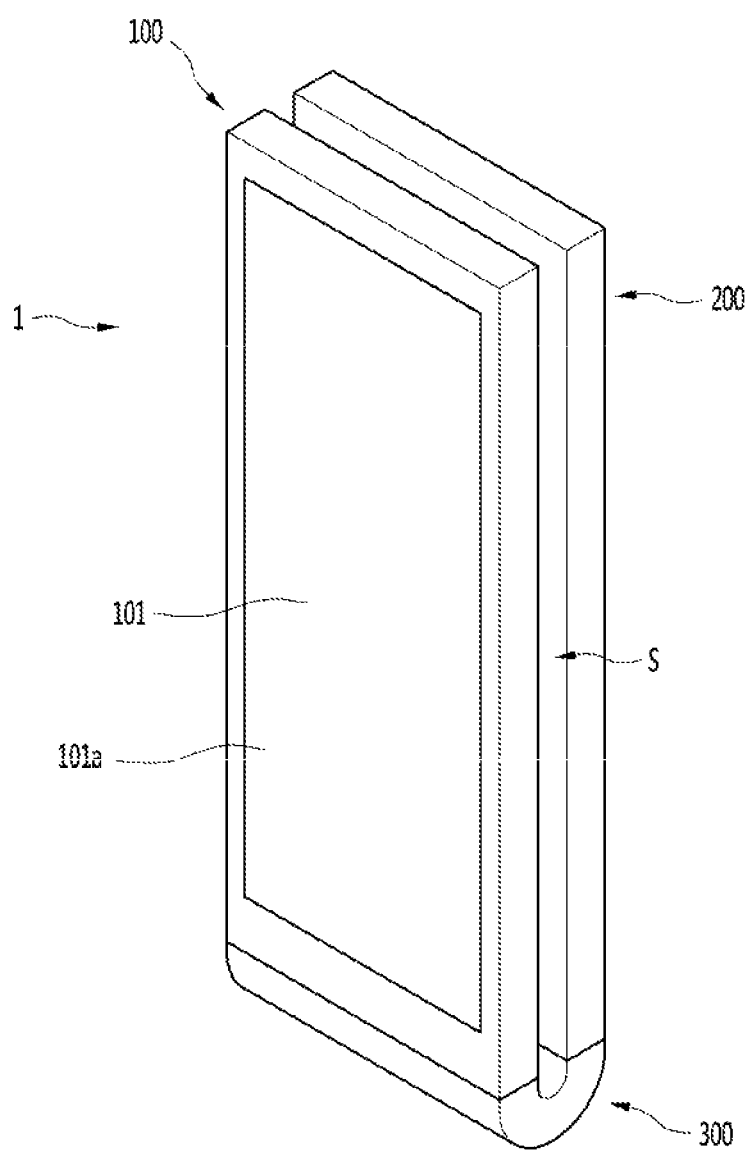
FIG. 1 is a front perspective view illustrating a mobile device according to an embodiment of the present invention.

Hereinafter, embodiments disclosed in the present specification will be described in detail with reference to the accompanying drawings, the same or similar elements are designated by the same reference number regardless of reference numerals, and duplicate descriptions thereof will be omitted. The suffixes "module" and "unit" for elements used in the following description are assigned or mixedly used in consideration of ease of writing of the specification, and do not have meanings or roles discriminated from each other by itself. Further, in description of the embodiments disclosed in the present specification, when it is determined that the detailed descriptions of the related well-known technologies make the subject matter of the embodiments disclosed in the present specification unclear, the detailed descriptions thereof will be omitted. Further, the accompanying drawings are merely for easily understanding the embodiments disclosed in the present specification, the technical spirit disclosed in the present specification is not limited by the accompanying drawings, and it should be understood that all changes, equivalents and substitutions included in the spirit and the technical scope of the present invention are included.

A mobile device described in the present specification may include a cell phone, a smart phone, a laptop computer, a digital broadcasting terminal, a personal digital assistant (PDA), a portable multimedia player (PMP), a navigation, a slate PC, a tablet PC, an ultra-book and a wearable device (for example, a smart watch, a smart glass and a head mounted display (HMD)) and the like.

However, it could be easily understood by those skilled in the art that configurations according to the embodiments disclosed in the present specification may be applied even to a stationary terminal such as a digital TV, a desktop computer and a digital signage, except for a case where they may be applied only to the mobile device.

Figure 2:
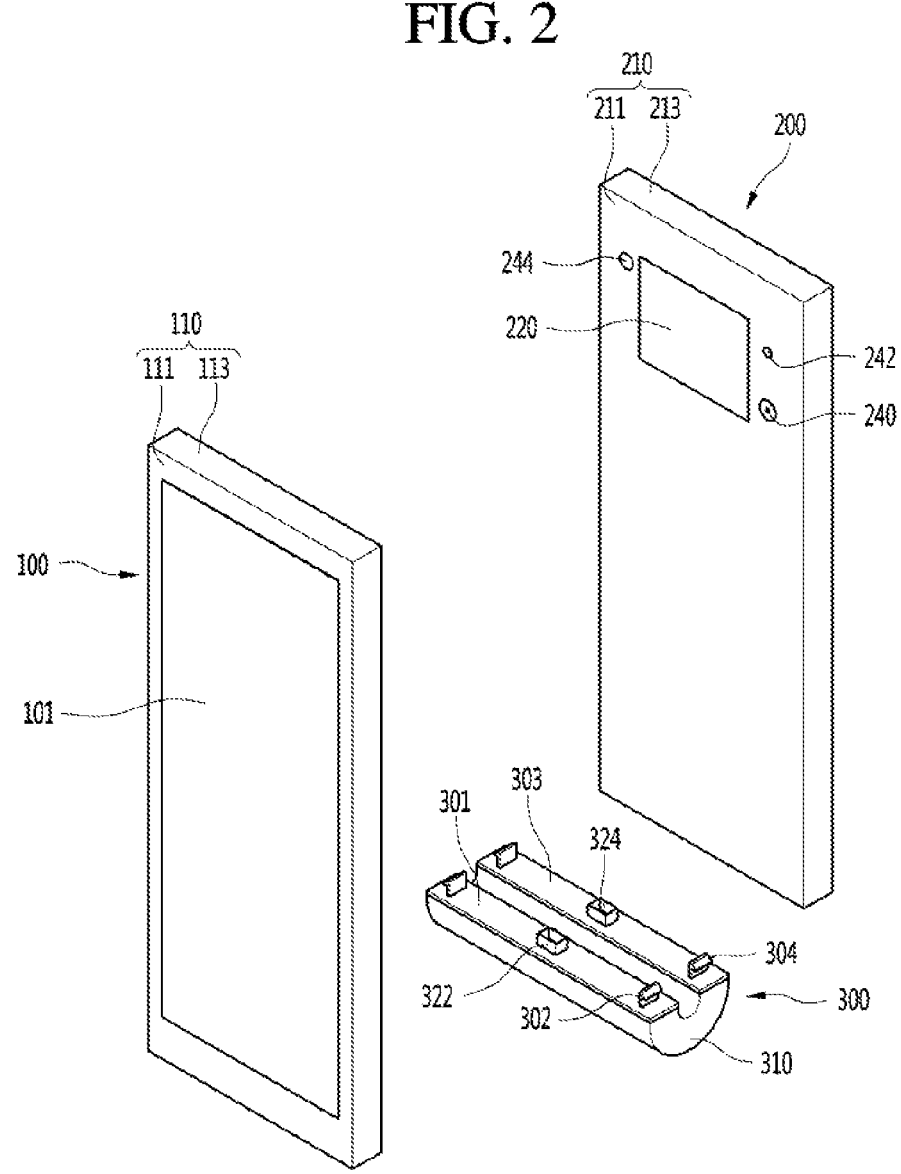
FIG. 2 is an exploded perspective view illustrating a mobile device according to an embodiment of the present invention.

FIG. 1 is a front perspective view illustrating a mobile device according to an embodiment of the present invention, and FIG. 2 is an exploded perspective view illustrating the mobile device according to the embodiment of the present invention.

Referring to FIGS. 1 and 2, a mobile device 1 according to the embodiment of the present invention includes a first body 100 through which an image is output, a second body 200 arranged in parallel to the first body 100 and having an electronic element for transferring electric power and a control instruction to the first body 100, and a connection member 300 electrically connecting the first body 100 and the second body 100 to each other.

The first body 100 includes a case 110 (for example, a frame, a housing, a cover and the like) defining an outer appearance. As illustrated, the case 110 may include a first front case 111 and a first rear case 113. Various kinds of electronic elements are arranged inside an inner space formed by coupling between the first front case 111 and the first rear case 113. At least one middle case may be additionally arranged between the first front case 111 and the first rear case 113.

Such a case 110 may be formed by injecting synthetic resin or may be formed of metal, for example, stainless steel (STS), aluminum (Al), titanium (Ti) and the like.

The first body 100 has a bar-shaped terminal body. A display unit 101 is arranged on a front surface of the first body 100 to output information. As illustrated, a window 101a of the display unit 101 is mounted on the first front case 111 to define the front surface of the first body 100 together with the first front case 111.

Dissimilar to the above example where the inner space accommodating various kinds of electronic elements is defined by a plurality of cases, the first body 100 may be formed such that the inner space is defined by one case. In this case, the first body 100 formed of synthetic resin or metal and corresponding to a unibody extending from a side surface to a rear surface may be implemented.

Meanwhile, the mobile device 100 may include a waterproof part (not illustrated) preventing water from being permeated into the terminal body. For example, the waterproof part may include waterproof members provided between the window 101a and the first front case 111 and between the first front case 111 and the first rear case 113 to seal the inner space when they are coupled to each other.

The display unit 101 displays (outputs) information processed by the second body 100. For example, the display unit 101 may display information on an execution screen of an application program driven by the mobile device 1 or information on a user interface (UI) and a graphic user interface (GUI) according to the information on the execution screen.

The display unit 101 may include at least one of a liquid crystal display (LCD), a thin-film transistor-liquid crystal display (TFT LCD), an organic light emitting diode (OLED), a flexible display, a three-dimensional display and an electronic-ink display.

The display unit 101 may include a touch sensor detecting a touch on the display unit 101 to receive input of a control instruction through a touch scheme. Using the same, when a touch is made on the display unit 101, the touch sensor detects the touch, and a control unit (not illustrated) generates a control instruction corresponding to the touch based on the same. The contents input through the touch scheme are a letter or a number, or a menu item that may be indicated or designated in various modes.

Meanwhile, the touch sensor is formed in a film form having a touch pattern to be arranged between the window 101a and a display (not illustrated) on a rear surface of the window 101a or may be a metal wire directly patterned on the rear surface of the window 101a. Further, the touch sensor may be formed integrally with the display. For example, the touch sensor may be arranged on a substrate of the display or may be provided inside the display.

In this way, the display unit 101 may have a touch screen together with the touch sensor, in which case the touch screen may function as a user input unit.

The second body 200 is arranged in parallel to the first body 100 to be spaced apart from the first body 100 by a predetermined interval. Thus, the size and the shape of the second body 200 may be the same as those of the first body 100.

The second body 200 includes a case 210 (for example, a frame, a housing, a cover and the like) defining an outer appearance. As illustrated, the case 210 may include a second front case 211 and a second rear case 213. Various kinds of electronic elements are arranged inside an inner space formed by coupling between the second front case 211 and the second rear case 213. At least one middle case may be additionally arranged between the second front case 211 and the second rear case 213.

When a surface of the second body 200, which faces the first body 100, is assumed as a front surface and an opposite surface thereto is assumed as a rear surface, an auxiliary display unit 220 through which an image is output may be provided on the front surface of the second body 200.

Like the display unit 101, the auxiliary display unit 220 may include at least one of a liquid crystal display (LCD), a thin-film transistor-liquid crystal display (TFT LCD), an organic light emitting diode (OLED), a flexible display, a three-dimensional display and an electronic-ink display. Further, the auxiliary display unit 220 may also include a touch sensor detecting a touch on the display unit 220 to receive input of a control instruction through a touch scheme.

Thus, the auxiliary display unit 220 may perform a control such that the same screen as the image output on the display unit 101 or a different image therefrom is output.

A first camera 240 may be mounted on one side edge of the auxiliary display unit 220. A first detection sensor 242 is provided on one side of a left edge and a right edge of the second body 200 and a second detection sensor 244 is provided on the other side of the left edge and the right edge of the second body.

The leftward or rightward movements of the first body 100 and the second body 200 are detected by the first detection sensor 242 and the second detection sensor 244, and descriptions thereof will be made below. Further, a distance between the mobile device 1 and a subject is detected by a detection sensor, which is closer to the first camera 240, among the first detection sensor 242 and the second detection sensor 244.

The first camera 121a processes an image frame of a still image or a moving image obtained by an image sensor in a shooting mode or a video call mode. The processed image frame may be displayed on the display unit 101 or the auxiliary display unit 220 and may be stored in a memory.

The connection member 300 is coupled to the first body 100 and the second body 200 at lower ends of the first body 100 and the second body 200, respectively, to mutually electrically connect the first body 100 and the second body 200 to each other.

As illustrated in the drawings, the connection member 300 includes a body 310 defining an outer appearance, a first installation part 301 and a second installation part 303 provided on an upper surface of the body 310, on which the first body 100 and the second body 200 are positioned, respectively.

The body 310 has a semicircular side surface having a groove formed at a center thereof.

A material of the boy 310 may be a flexible material. Thus, when an external force is applied to the body 310, the body 310 is deformed, so that various angles may be formed such that the first body 100 and the second body 200 may move in a direction in which they cross each other or in a direction in which they are parallel to each other.

Further, a material of the boy 310 may be a rigid material not deformed by the external force. In this case, the connection member 300 is coupled to the first body 100 and the second body 300 to fix the first body 101 and the second body 200 to each other.

Hereinafter, for convenience of description, an example where the material of the body 310 is manufactured of a flexible material will be described.

Meanwhile, catching protrusions 301 and 302 to be coupled to the first body 100 and the second body 200 and terminals 322 and 324 to be electrically connected to the first body 100 and the second body 200 are formed in the first installation part 301 and the second installation part 303, respectively. A coupling structure of the connection member 300 and the bodies 100 and 200 will be described below.

Figure 3:
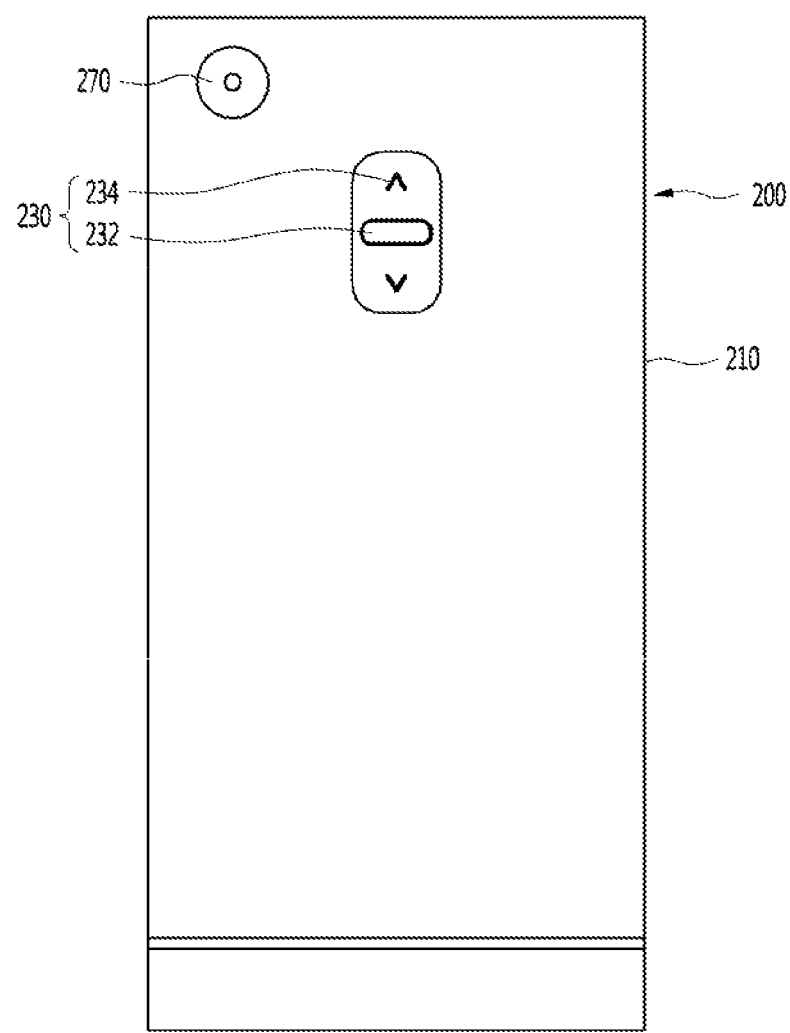
FIG. 3 is a sectional view illustrating a rear surface of a second body according to the embodiment of the present invention.

FIG. 3 is a sectional view illustrating a rear surface of the second body according to the embodiment of the present invention.

Referring to FIG. 3, a second camera 270 may be arranged on a rear surface of the second body 200. In this case, the second camera 270 has a shooting direction that is substantially opposite to the first camera 240.

Further, a rear input unit 230 may be provided on a rear surface of the second body 200 as an example of the user input unit. The rear input unit 230 is manipulated to receive input of an instruction for controlling an operation of the mobile device 1, and input contents may be variously set. For example, the rear input unit 230 may receive input of instructions such as an ON/OFF operation of a power source, start, termination, and scrolling and instructions such as adjusting of the size of sounds output by a voice outputting unit and switching of the display unit 101 into a touch recognition mode. The rear input unit 230 may be implemented in which a touch input, a push input and an input by a combination thereof may be performed.

In detail, the rear input unit 230 includes a first button part 232 exposed from the rear surface of the second body 200 to the outside to receive a push input having a first function and a second button part 234 having keys arranged on opposite sides of the first button part 232 to receive a push input having a second function that is different from the first function. The second button part 234 has a through-hole at a center thereof so that the first button part 232 is arranged at a center of the second button part 234.

As an example of a user input, the first function may be a function related to the ON/OFF operation of the power source and activation of the display unit 101, and the second function may be a function related to scrolling of output information of the display unit or adjusting of the volume of sounds output by the mobile device 1.

The rear input unit 230 may be arranged to overlap the auxiliary display unit 201 on a front surface thereof in a thickness direction of the terminal body. As an example, the rear input unit 230 may be arranged at a rear upper end of the second body 200 such that the user may easily manipulate the terminal body using an index finger when holding the terminal body by one hand. However, the present invention is not necessarily limited thereto, and a location of the rear input unit 230 may be changed.

In this way, when the rear input unit 230 is provided on the rear surface of the second body 200, a new type of user interface may be implemented using the same. Further, the display unit 151 may be a larger screen due to the above-described touch screen or the rear input unit 230.

Figure 4:
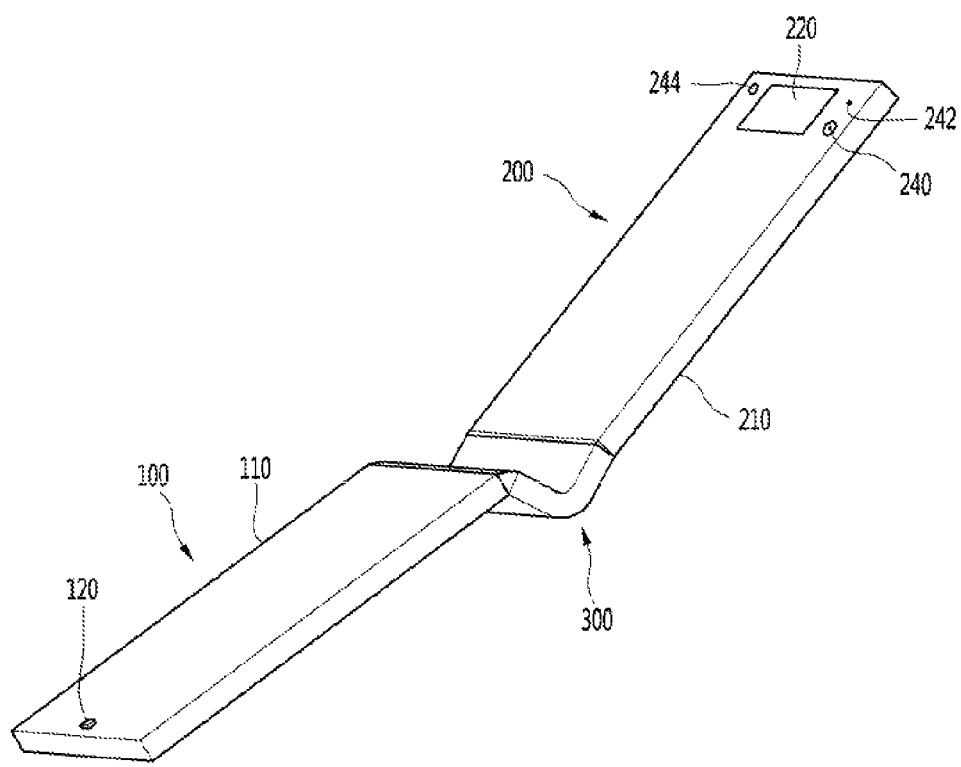
FIG. 4 is a perspective view illustrating a state in which a first body is relatively moved with respect to the second body according to the embodiment of the present invention.
Figure 5:
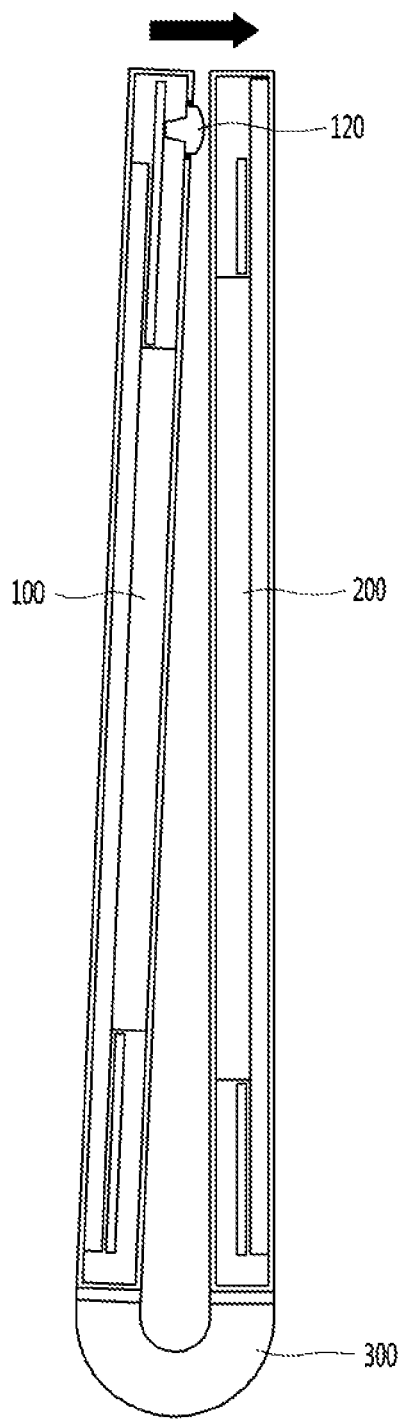
FIG. 5 is a side sectional view illustrating the mobile device in a state in which a button part is manipulated according to the embodiment of the present invention.

FIG. 4 is a perspective view illustrating a state in which the first body is relatively moved with respect to the second body according to the embodiment of the present invention, and FIG. 5 is a side sectional view illustrating the mobile device in a state in which a button part is manipulated according to the embodiment of the present invention.

Referring to FIG. 4, because the body 310 of the connection member 300 is manufactured of a flexible material, the first body 100 may be relatively moved with respect to the second body 200. It is apparent that the second body 200 may be relatively moved with respect to the first body 100. Further, although a state in which the first body 100 is moved in a vertical direction that is a direction in which it goes farther away from the second body 200 is illustrated in the present drawing, the first body 100 may be moved to left and right sides of the 'second body 200.

When a surface of the first body 100, on which the display unit 101 is formed, is assumed as a front surface and an opposite surface thereto is assumed as a rear surface, a button part 120 as another example of the user input unit may be provided on the rear surface of the first body 100.

The button part 120 is manipulated to receive input of an instruction for controlling an operation of the mobile device 1, and input contents may be variously set. For example, referring to FIG. 5, when an image frame processed by the second camera 270 in a camera shooting mode is displayed on the display unit 101, the user pushes the front surface of the first body 100 and the rear surface of the second body 200 such that the rear surface of the first body 100 comes into contact with the front surface of the second body 200.

Because of this, since the button part 120 is pushed on the front surface of the second body 200, a camera shooting instruction is transferred to the second camera 270 to perform shooting.

Further, functions related to the ON/OFF operation of the power source or the activation of the display unit 101 may be performed through the pushing of the button part 120.

Hereinafter, a structure of the connection member 300 will be described.

Figure 6:
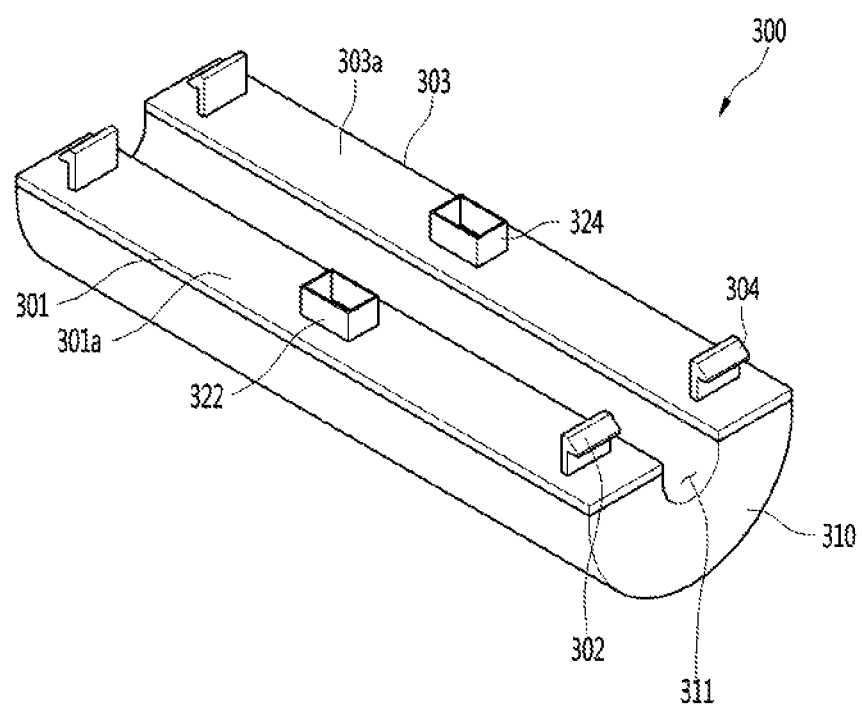
FIG. 6 is a perspective view illustrating a connection member according to the embodiment of the present invention.
Figure 7:
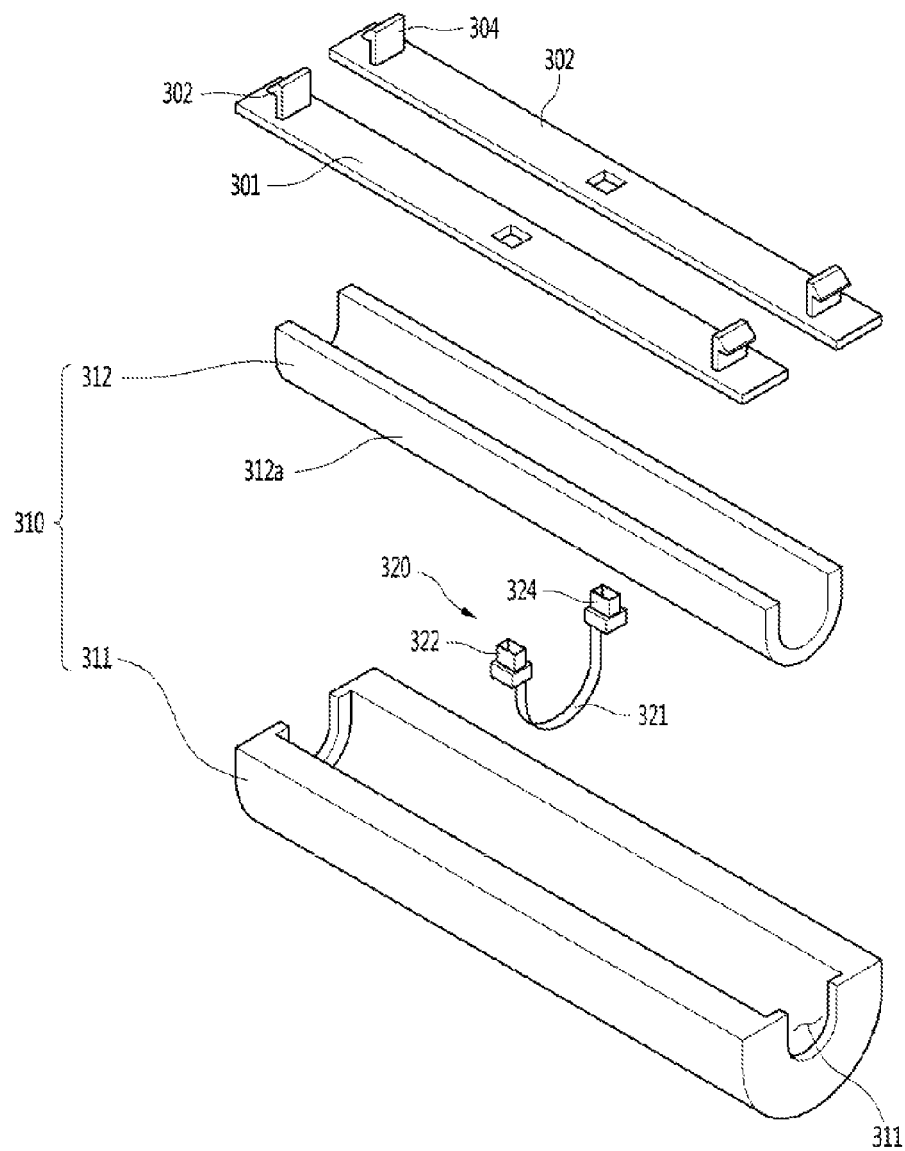
FIG. 7 is an exploded perspective view illustrating the connection member according to the embodiment of the present invention.

FIG. 6 is a perspective view illustrating the connection member according to the embodiment of the present invention, and FIG. 7 is an exploded perspective view illustrating the connection member according to the embodiment of the present invention.

Referring to FIGS. 6 and 7, as described above, the first installation part 301 on which the first body 100 is positioned and the second installation part 303 on which the second body is positioned are provided on the upper surface of the body 310 while a groove 311 formed in the body 310 is interposed therebetween.

In detail, the first installation part 301 includes a first installation surface 301a on which a bottom surface of the first body 100 is positioned, and the second installation part 303 includes a second installation surface 303a on which a bottom surface of the second body 200 is positioned.

Further, first catching protrusions 302 to be inserted into coupling grooves formed in the first body 100 are formed at opposite side edges of the first installation surface 301a, respectively, and second catching protrusions 304 to be inserted into coupling grooves formed in the second body 200 are formed at opposite side edges of the second installation surface 303a, respectively.

Meanwhile, the body 310 includes a first frame 311 defining an outer appearance and a second frame 312 fitted in the first frame 311.

The first frame 311 has the groove 311 inward formed on a semicircular cross-section thereof. Further, the second frame 312 is coupled to an inside of the first frame 311 in which the groove 311 is formed. That is, an outer peripheral surface 312a of the second frame 312 comes into contact with an inner peripheral surface of the groove 311 so that the first frame 311 and the second frame 312 are coupled to each other.

A connection part 320 is provided between the first frame 311 and the second frame 312. The connection part 320 is coupled to the first body 100 and the second body 200 to electrically connect the first body 100 and the second body 200 to each other.

The connection part 320 includes a flexible substrate 321 that is deformable by an external force, a first terminal 322 formed at one end of the flexible substrate 321 and inserted into the first body 100, and a second terminal 324 formed at the other end of the flexible substrate 321 and inserted into the second body 200.

Further, through-holes are formed in the first installation part 301 and the second installation part 303 such that the first terminal 322 and the second terminal 324 pass therethrough, respectively. Thus, as illustrated, when the first installation part 301 and the second installation part 303 are coupled to the upper surface of the body 310, the first terminal 322 and the second terminal 324 protrude upward from the installation surfaces 301a and 303a, respectively.

Figure 8:
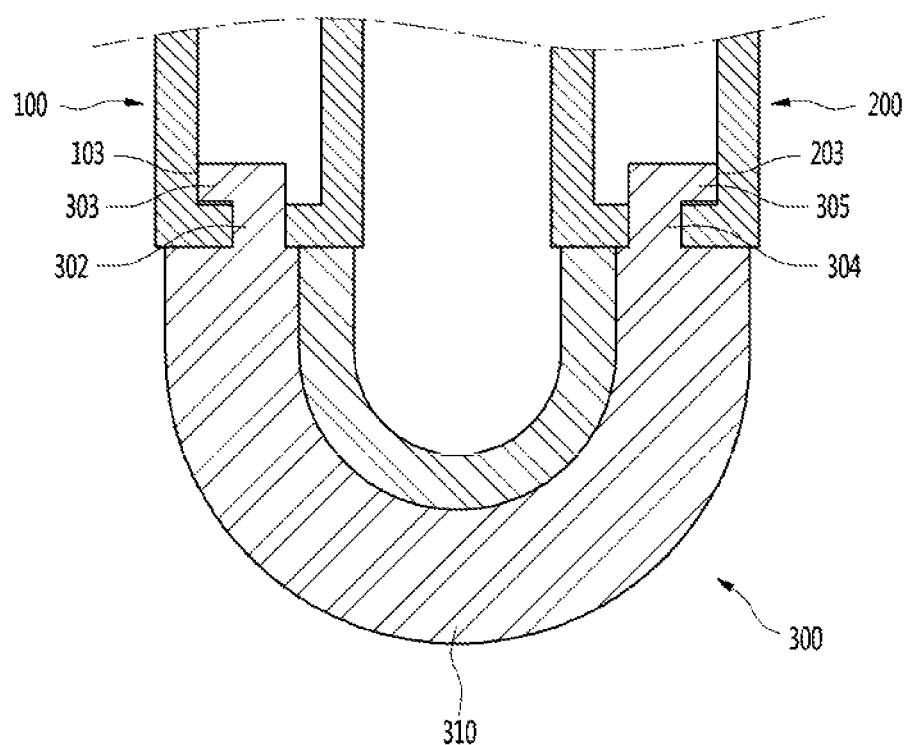
FIG. 8 is a sectional view illustrating a state in which the first body and the second body are coupled to the connection member according to the embodiment of the present invention.

FIG. 8 is a sectional view illustrating a state in which the first body and the second body are coupled to the connection member according to the embodiment of the present invention.

Referring to FIG. 8, coupling grooves 103 and 203 extending toward insides of the first body 100 and the second body 200 are formed on the bottom surfaces of the first body 100 and the second body 200, respectively. The coupling grooves 103 and 203 are formed at opposite ends of the bottom surfaces of the first body 100 and the second body 200 to correspond to the catching protrusions 302 and 304 formed on the installation surfaces 301a and 303a of the connection member 300, respectively.

Further, first protrusions 303 extending toward insides of the coupling grooves 103 are formed at ends of the first catching protrusions 302, respectively, and second protrusions 305 extending toward insides of the coupling grooves 203 are formed also at ends of the second catching protrusions 304, respectively.

As illustrated, when the catching protrusions 302 and 304 are inserted into the coupling grooves 103 and 203, respectively, the first protrusions 303 are caught by the first front case 111 of the first body 100, and the second protrusions 305 is caught by the second rear case 213 of the second body 200. Thus, the first body 100 and the second body 200 may be mutually electrically connected to each other through the connection member 300.

Meanwhile, although not illustrated, the first body 100 and the second body 200 may be coupled to the connection member 300 by a magnetic force. In this case, as metals are attached to the bottom surfaces of the first body 100 and the second body 100 or the installation surfaces 301a and 303a and magnets are coupled to the others thereof, the first body 100 and the second body 200 may be coupled to the connection member 300.

Figure 9:
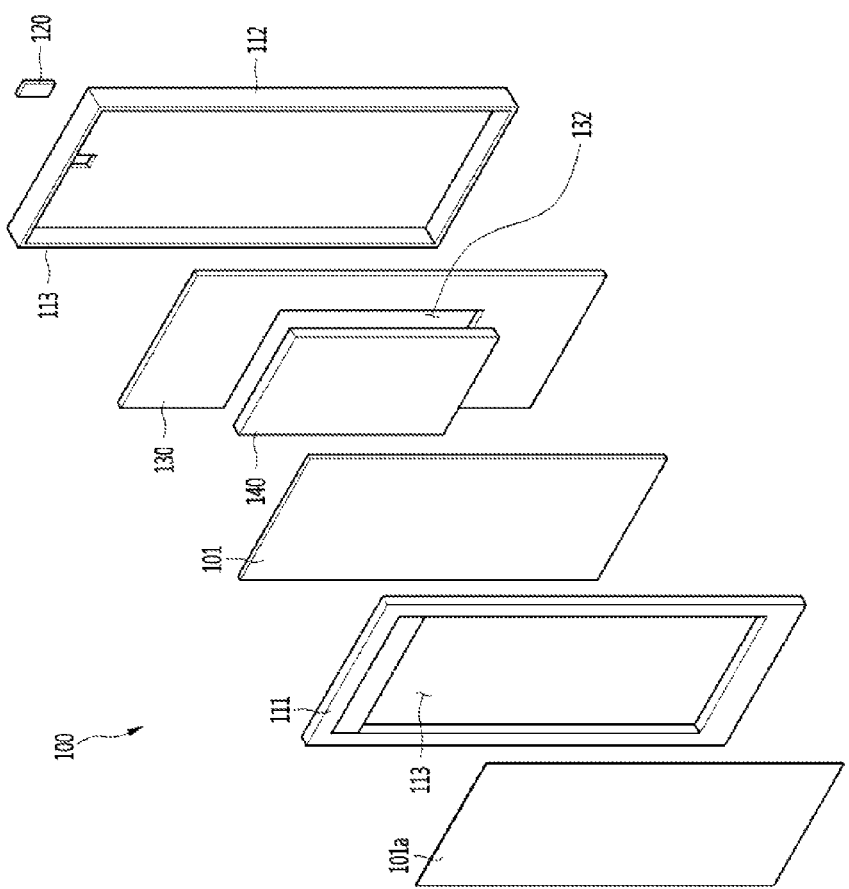
FIG. 9 is a perspective view illustrating a state in which the first body is decomposed according to the embodiment of the present invention.

FIG. 9 is a perspective view illustrating a state in which the first body is decomposed according to the embodiment of the present invention.

Referring to FIG. 9, the first body 100 includes a case 110 defining an outer appearance, a window 101a defining a front surface of the case 110, a display unit 101 outputting an image on a rear surface of the window 101a, and an auxiliary battery 140 and an auxiliary substrate part 130 arranged inside the case 110.

As described above, the case 110 is formed by coupling the first front case 111 and the first rear case 113 to each other, and the display unit 101, the auxiliary battery 140, and the auxiliary substrate part 130 are arranged in an inner space defined by coupling the first front case 111 and the first rear case 113.

An exposure hole 113 is formed on a front surface of the first front case 111 such that the display unit 101 is exposed to the outside through the window 101a. Further, the window 101a is inserted into edges of the exposure hole 113 on the front surface of the first front case 111.

The auxiliary substrate part 130 is arranged on a rear surface of the display unit 101, and electronic elements for driving the first body 110 are mounted thereon. A groove 132 on which the auxiliary battery 140 is seated is formed on one side of the auxiliary substrate part 130, and the auxiliary battery 140 is provided along a circumference of the groove 132 to supply electric power required by the first body 110.

In this way, as the auxiliary battery 140 and the auxiliary substrate part 130 are provided even in the first body 100, the first body 100 may be independently driven even when the first body 100 and the second body 200 are separated from each other. Meanwhile, it is apparent that the mobile device 1 may be designed such that the auxiliary battery 140 and the auxiliary substrate part 130 are not auxiliary conceptual configurations of a main battery 250 and a main substrate part 260 arranged in the second body 200, which will be described below.

The first rear case 113 covers the rear surface of the first body 100. The hole 113 is formed on the first rear case 113 such that a pressure of the button part 120 is transferred, and a push pressure of the button part 120 is transferred to the auxiliary substrate part 130 through the hole 113.

Figure 10:
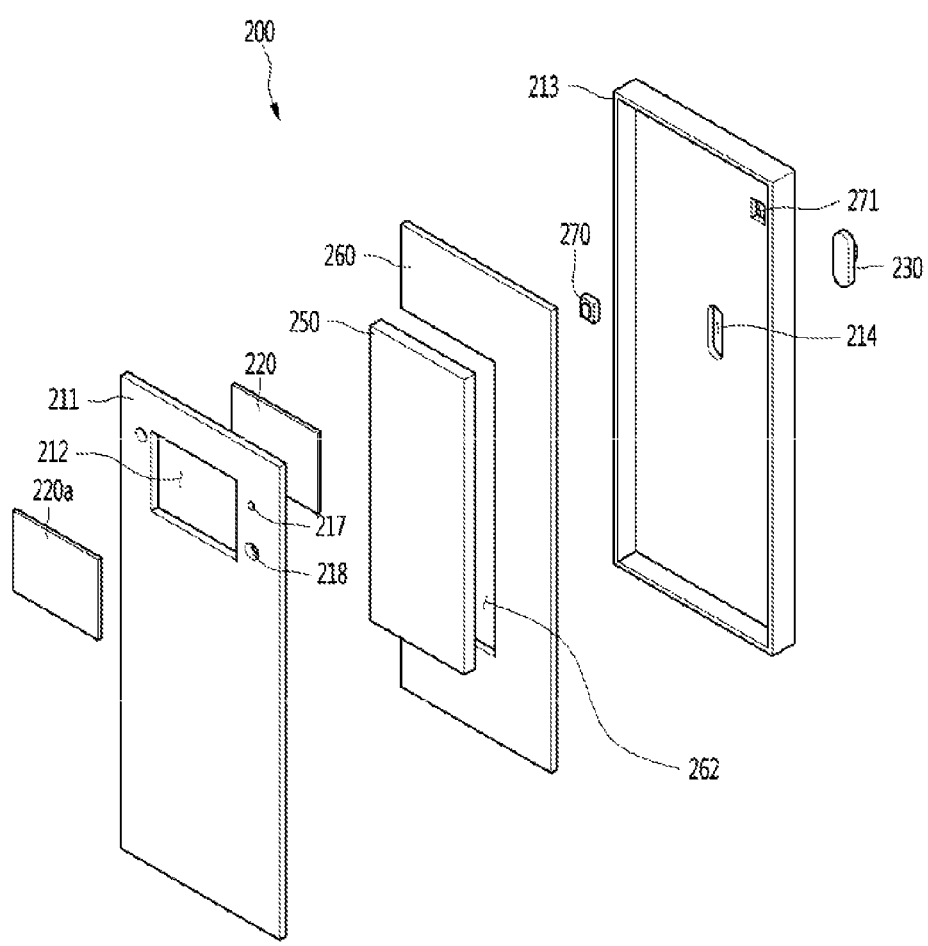
FIG. 10 is a perspective view illustrating a state in which the second body is decomposed according to the embodiment of the present invention.

FIG. 10 is a perspective view illustrating a state in which the second body is decomposed according to the embodiment of the present invention.

Referring to FIG. 10, the second body 200 includes a case 210 defining an outer appearance, a window 220a defining a front surface of the case 210, an auxiliary display unit 220 on a rear surface of the window 220a to output an image, and a main battery 250 and a main substrate part 260 arranged inside the case 210.

The case 210 is formed by coupling the second front case 211 and the second rear case 213 to each other, and the auxiliary display unit 220, the main battery 250, and the main substrate part 260 are arranged in an inner space defined by coupling the second front case 211 and the second rear case 213.

An exposure hole 212 is formed on a front surface of the second front case 211 such that the auxiliary display unit 220 is exposed to the outside through the window 220a. Further, the window 220a is inserted into edges of the exposure hole 212 on the front surface of the second front case 211. The auxiliary display unit 220 is formed to have a size that is relatively smaller than that of the display unit 101 so as to assist a displayed screen of the display unit 101 or display another screen. In contrast, it is apparent that the auxiliary display unit 220 is also formed to correspond to the size of the display unit 101.

The main substrate part 260 is arranged on a rear surface of the display unit 220, and electronic elements for driving the first body 100 and the second body 200 are mounted thereon. A groove 262 on which the main battery 250 is seated is formed on one side of the main substrate part 260, and the main battery 250 is provided along a circumference of the groove 262 to supply electric power required for driving the mobile device 100.

The second rear case 213 covers the rear surface of the second body 200. The rear input unit 230 and holes 214 and 271 through which the second camera 270 is exposed to the outside are formed on the second rear case 213. Thus, the second camera 270 mounted on the main substrate part 260 is exposed to the outside, and a push pressure of the rear input unit 230 is also transferred to the main substrate part 260.

Figure 11:
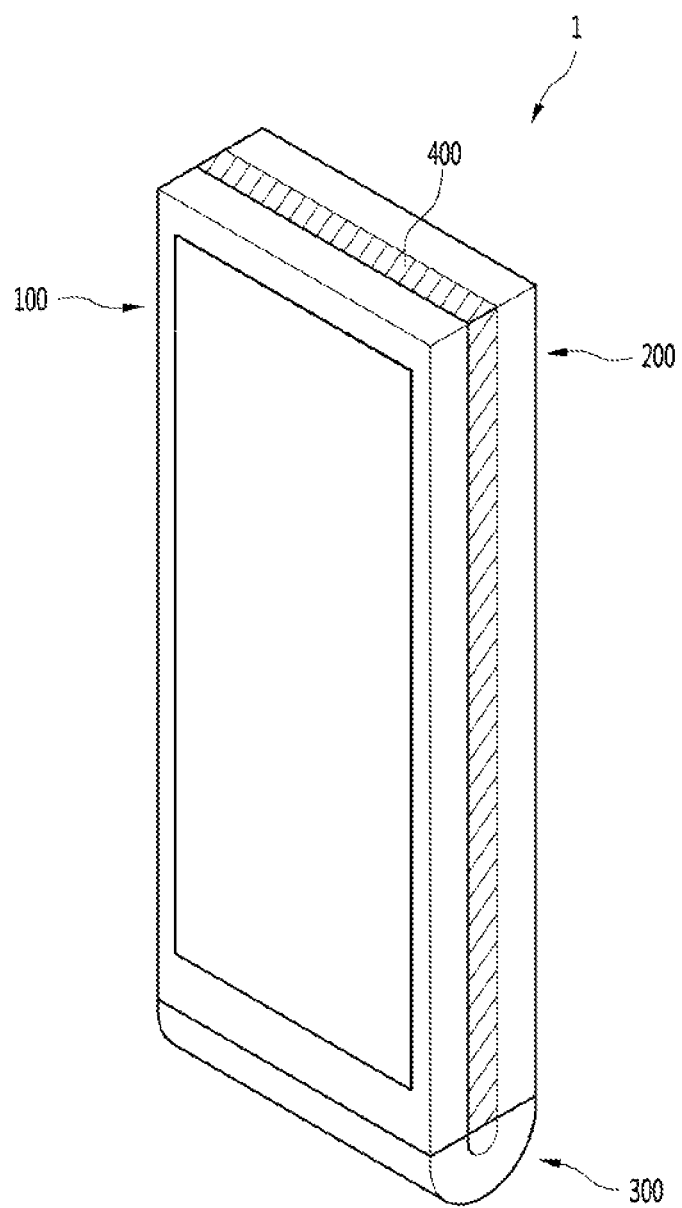
FIG. 11 is a perspective view illustrating the mobile device in a state in which an auxiliary module is mounted thereon according to the embodiment of the present invention.
Figure 12:
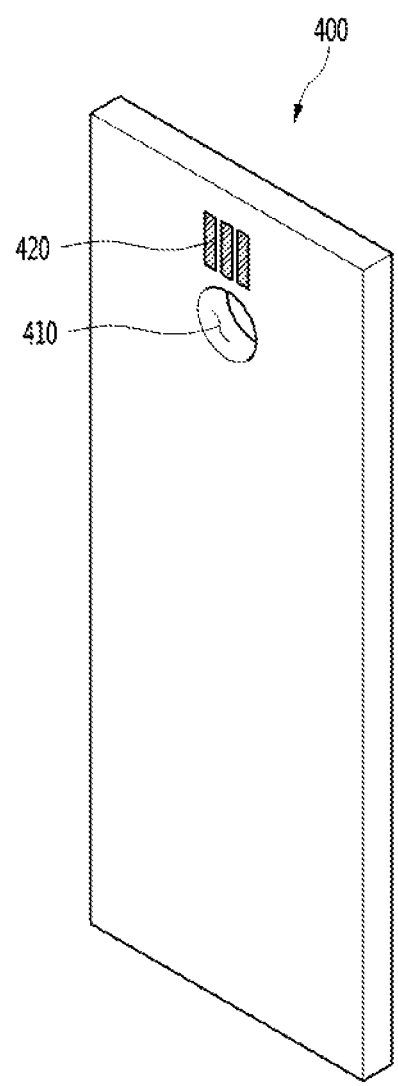
FIG. 12 is a perspective view illustrating the auxiliary module according to the embodiment of the present invention.
Figure 13:
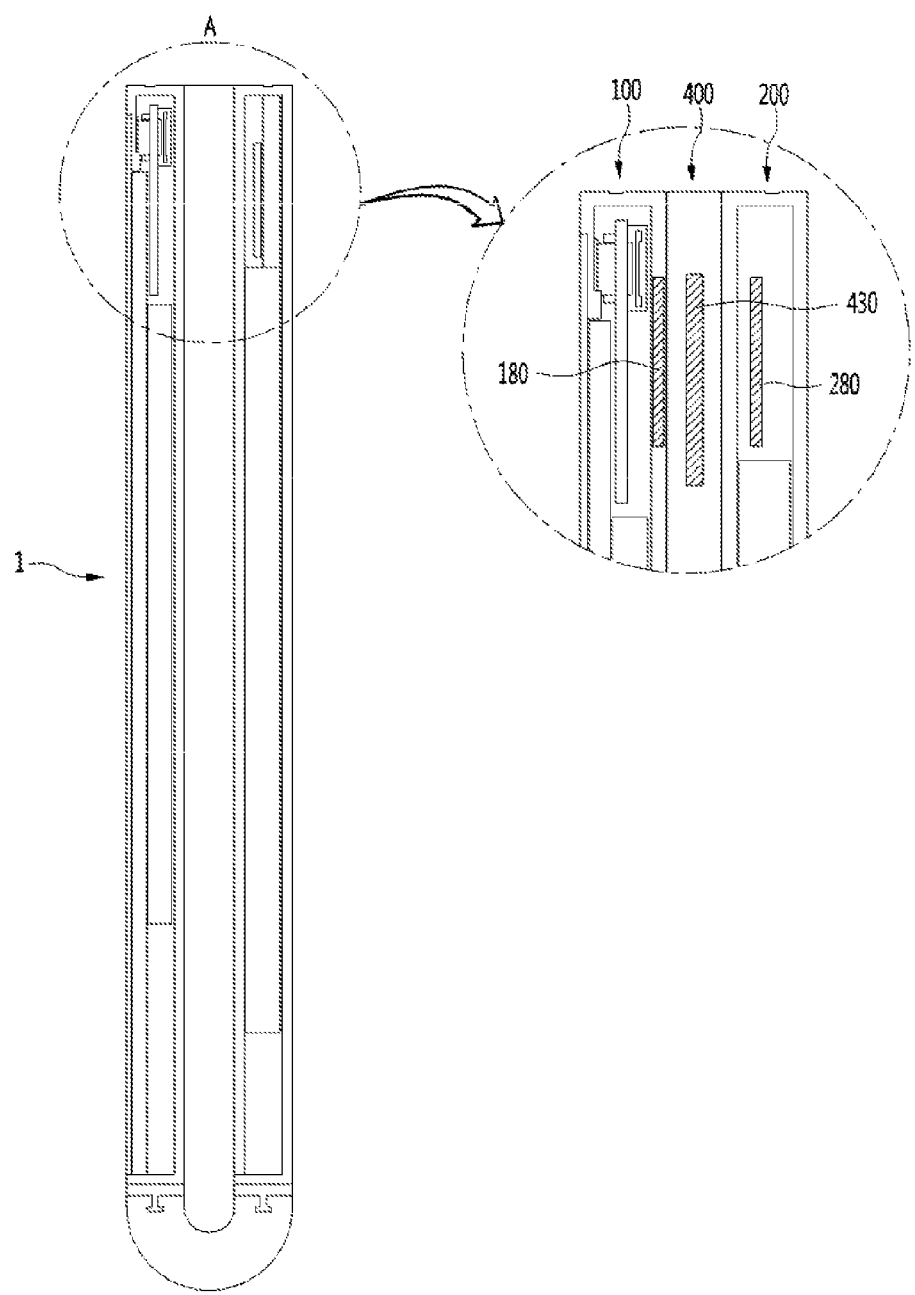
FIG. 13 is an enlarged view for explaining a coupling relationship of the auxiliary module according to the embodiment of the present invention.
Figure 14:
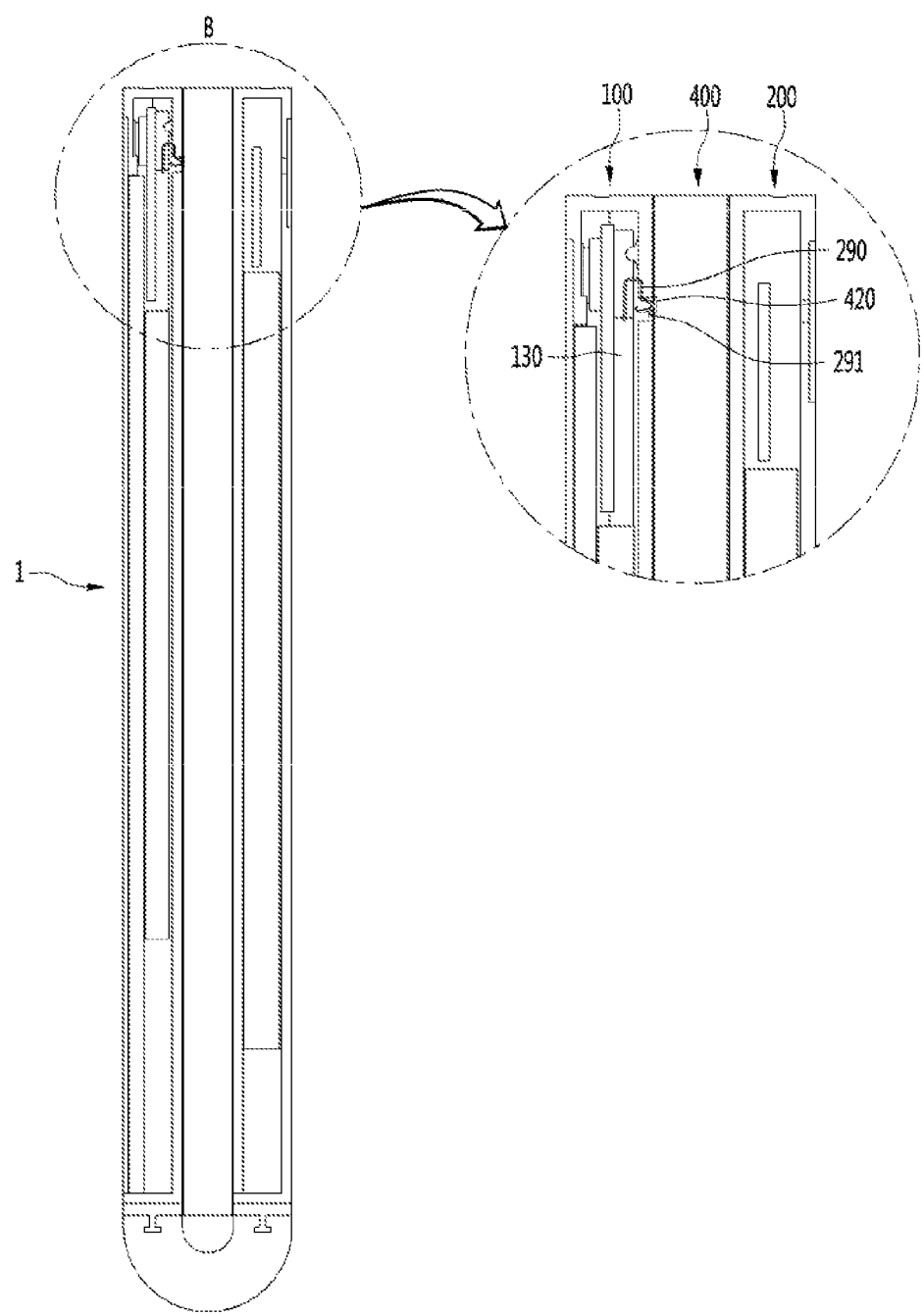
FIG. 14 is a sectional view for explaining a connection relationship of the auxiliary module according to the embodiment of the present invention.

FIG. 11 is a perspective view illustrating the mobile device in a state in which an auxiliary module is mounted thereon according to the embodiment of the present invention, and FIG. 12 is a perspective view illustrating the auxiliary module according to the embodiment of the present invention. FIG. 13 is an enlarged view illustrating a coupling relationship of the auxiliary module according to the embodiment of the present invention, and FIG. 14 is a sectional view illustrating a connection relationship of the auxiliary module according to the embodiment of the present invention.

Referring to FIG. 11, the mobile device 1 according to the embodiment of the present invention may further include an auxiliary module 400 inserted into a space S defined by the first mounting part 100 and the second mounting part 200.

The auxiliary module 400 is formed to correspond to the sizes and the shapes of the first mounting part 100 and the second mounting part 200 and is mounted on a space S defined by the first mounting part 100 and the second mounting part 200.

The auxiliary module 400 may have various functions. As an example, the auxiliary module 400 may function as a large capacity battery to supply electric power required for driving the mobile device 1. In this case, the auxiliary module 400 may supply electric power while being driven together with the main battery 250 and the auxiliary battery 140 and may serve as a battery pack used when the capacities of the main battery 250 and the auxiliary battery 140 are exhausted.

As another example, the auxiliary module 400 may serve as a speaker outputting stereoscopic sounds. In this case, the auxiliary module 400 may be implemented in a form of a loud speaker outputting various alarm sounds or reproduction sounds of multi-medias. Thus, the auxiliary module 400 may output the stereoscopic sounds together with speakers installed in the first body 100 and the second body 200 to satisfy a hearing sense of the user.

Referring to FIG. 12, the auxiliary module 400 may be formed to have an approximately plate shape corresponding to the sizes of the first body 100 and the second body 200. An insertion groove 410 is formed on one surface of the auxiliary module 400. The button part 120 formed on a rear surface of the first body 100 is inserted into the insertion groove 410. Thus, when the auxiliary module 400 is mounted in the space S, the first body 100 and the auxiliary module 400 are not spaced apart from each other by the button part 120.

Further, connection terminals 420 are formed above the button part 120 to be electrically connected to the first body 100. Thus, the connection terminals 420 will be described below.

Referring to FIG. 13, the auxiliary module 400 may be coupled to the first body 100 and the second body 200 by a magnetic force. In detail, a first metal part 180 is formed inside the first body 100 to be adjacent to the rear surface of the first body 100, and a second metal part 280 is formed inside the second body 200 to be adjacent to the front surface of the second body 200. Further, a magnet part 430 may be provided inside the auxiliary module 400 to be parallel to a vertical direction in which the first and second metal parts 180 and 280 face each other.

That is, the auxiliary module 400 is a magnetic member having a magnet provided therein, and the first and second metal parts 180 and 280 which are magnetic bodies are mounted on the insides of the first body 100 and the second body 200, so that the first body 100 and the second body 200 are maintained to be in close contact with the auxiliary module 400 by an interaction between the magnetic member and the magnetic bodies.

Thus, when the auxiliary module 400 is mounted in the space S, a magnetic force is generated between the magnetic part 430 and the first and second metal parts 180 and 280, so that the auxiliary module 400 is fixed to the space S.

A protrusion is formed at an upper end of the auxiliary module 400 so that the auxiliary module 400 may be fixed through a catching structure at upper ends of the first body 100 and the second body 200.

Referring to FIG. 14, the first body 100 may further include clips 290 to be electrically connected to the auxiliary module 400. Further, holes 291 through which the clips 290 are exposed to the outside may be formed on the rear surface of the first body 100. The holes 291 are formed to face the connection terminals 420 provided in the auxiliary module 400, respectively, when the auxiliary module 400 is mounted in the space S.

The clips 290 extend from one side of the auxiliary substrate part 130 arranged inside the first body 100 to be exposed to the outside of the first body 100 through the holes 291. Thus, the auxiliary module 400 is mounted in the space S and the clips 290 come into contact with the connection terminals 420 provided in the auxiliary module 400, so that the auxiliary module 400 and the first body 100 are electrically connected to each other.

Meanwhile, although an example where the clips 290 extend from the inside of the first body 100 toward the outside of the first body and the connection terminals 420 are arranged on a surface of the auxiliary module 400, which faces the first body 100, is described in the present embodiment, it is probable that the clips 290 extend from the inside of the second body 200 toward the outside of the second body 200 and the connection terminals 420 are arranged on a surface of the auxiliary module 400, which faces the second body 100, so that an electric connection is achieved.

Thus, when the auxiliary module 400 functions as a battery pack, the auxiliary module 400 may supply electric power to the first body 100 and the second body 200, and when the auxiliary module 400 functions as a speaker, the auxiliary module 400 may output sounds according to a control instruction.

Hereinafter, a shooting process for the mobile device 1 will be described.

Figure 15:
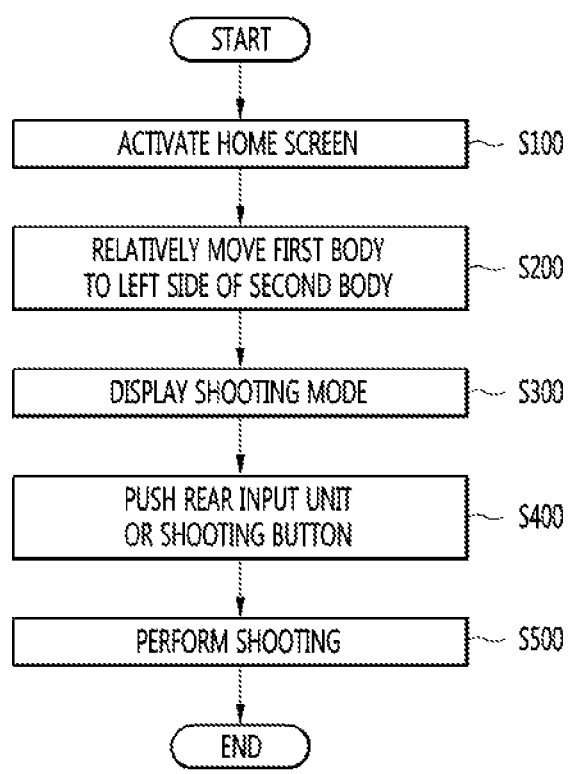
FIG. 15 is a flowchart illustrating a shooting process of the mobile device according to the embodiment of the present invention.
Figure 16:
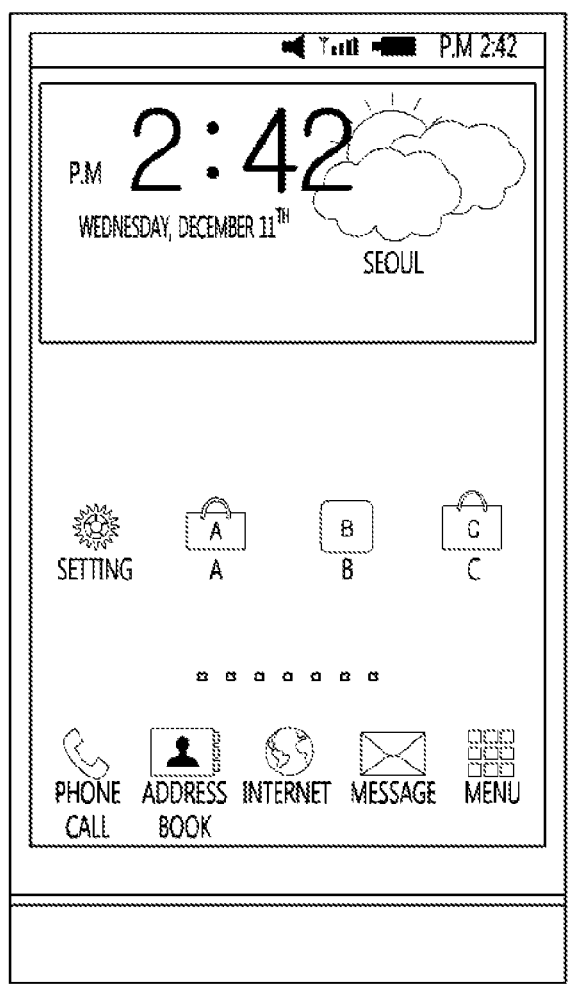
FIG. 16 is a view illustrating a home screen displayed on the mobile device according to the embodiment of the present invention.
Figure 17:
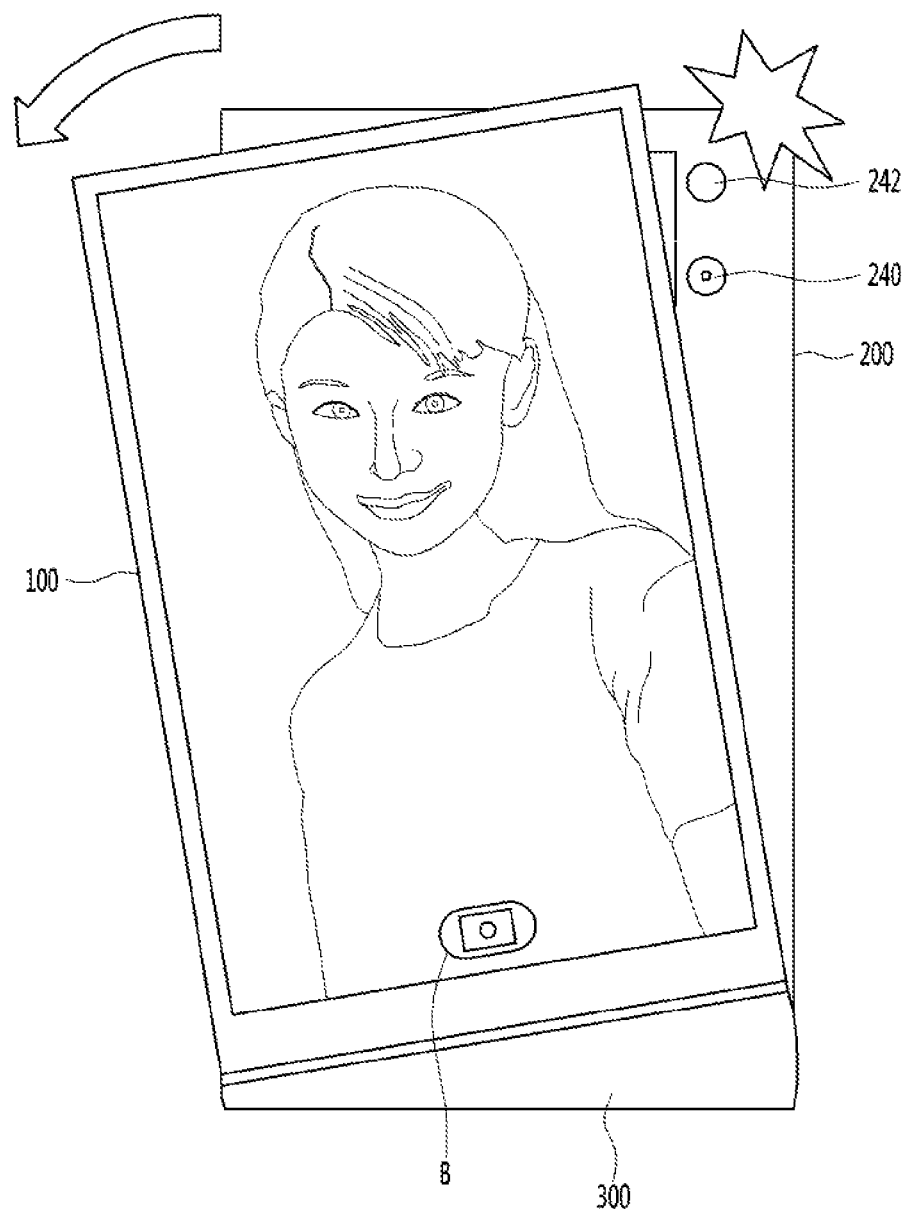
FIG. 17 is a view illustrating a shooting screen displayed on the mobile device according to the embodiment of the present invention.

FIG. 15 is a flowchart illustrating the shooting process of the mobile device according to the embodiment of the present invention, FIG. 16 is a view illustrating a home screen displayed on the mobile device according to the embodiment of the present invention, and FIG. 17 is a view illustrating a shooting screen displayed on the mobile device according to the embodiment of the present invention.

Referring to FIGS. 15 to 17, first, the user activates the home screen on the display unit 101 (S100). As an example, the home screen can be activated on display unit 101 by pushing the rear input unit 230 provided on the rear surface of the second body 200. Thus, as illustrated in FIG. 16, the home screen is displayed on the display unit 101.

In a state in which the home screen is output on the display unit 101, the user moves the first body 100 relatively to a left side of the second body 200 (S200). Thus, the first camera 240 and the first detection sensor 242 provided on the front surface of the second body 200 have been covered by the first body 100 and are exposed to the outside as the first body 100 is moved to a left side. The control unit detects that the first camera 240 and the first detection sensor 242 are exposed, and displays a shooting screen on the display unit 101, as illustrated in FIG. 17 (S300).

When the shooting mode is output to the display unit 101, an image frame of a subject is output to the display unit 101 by the first camera 240. Here, the first detection sensor 242 measures a distance from the subject to adjust a focus of the first camera 240.

When recognizing the image frame output to the display unit 101 and wanting shooting, the user pushes the rear input unit 230 (S400). Shooting is performed as the rear input unit 230 is pushed (S500), and the processed image frame may be displayed on the display unit 101 or the auxiliary display unit 202 and may be stored in the memory.

Further, the user performs shooting by directly touching a shooting button (B) provided on the shooting screen, on the shooting screen output to the display unit 101. In this case, the shooting is performed only using the shooting button (B) without pushing the rear input unit 230.

Thus, there is an advantage in that the user may enter the shooting mode using a simple operation in which the first body 100 and the second body 200 are moved.

Figure 18:
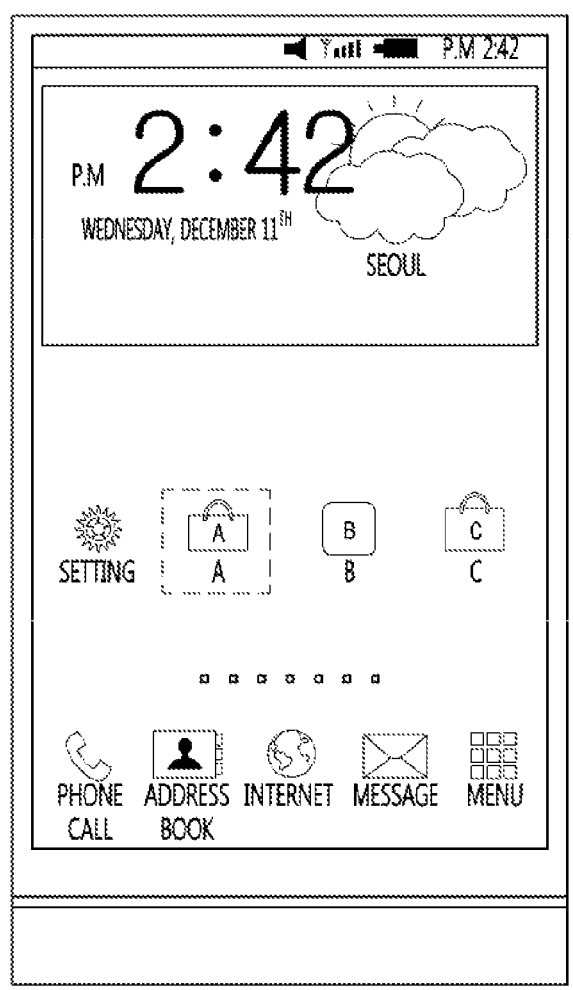
FIG. 18 is a view illustrating a home screen displayed on the mobile device according to the embodiment of the present invention.
Figure 19:
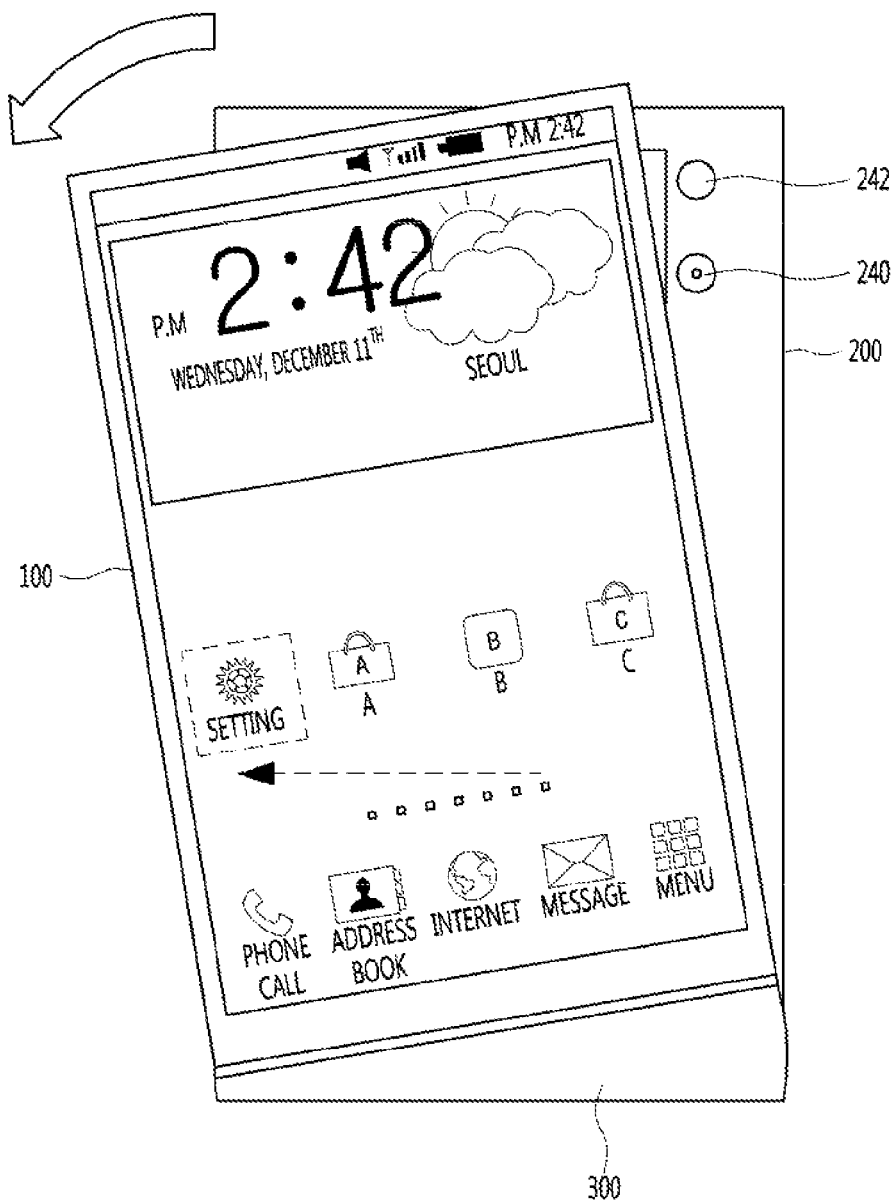
FIG. 19 is a view illustrating the home screen when the first body is moved leftward according to the embodiment of the present invention.
Figure 20:
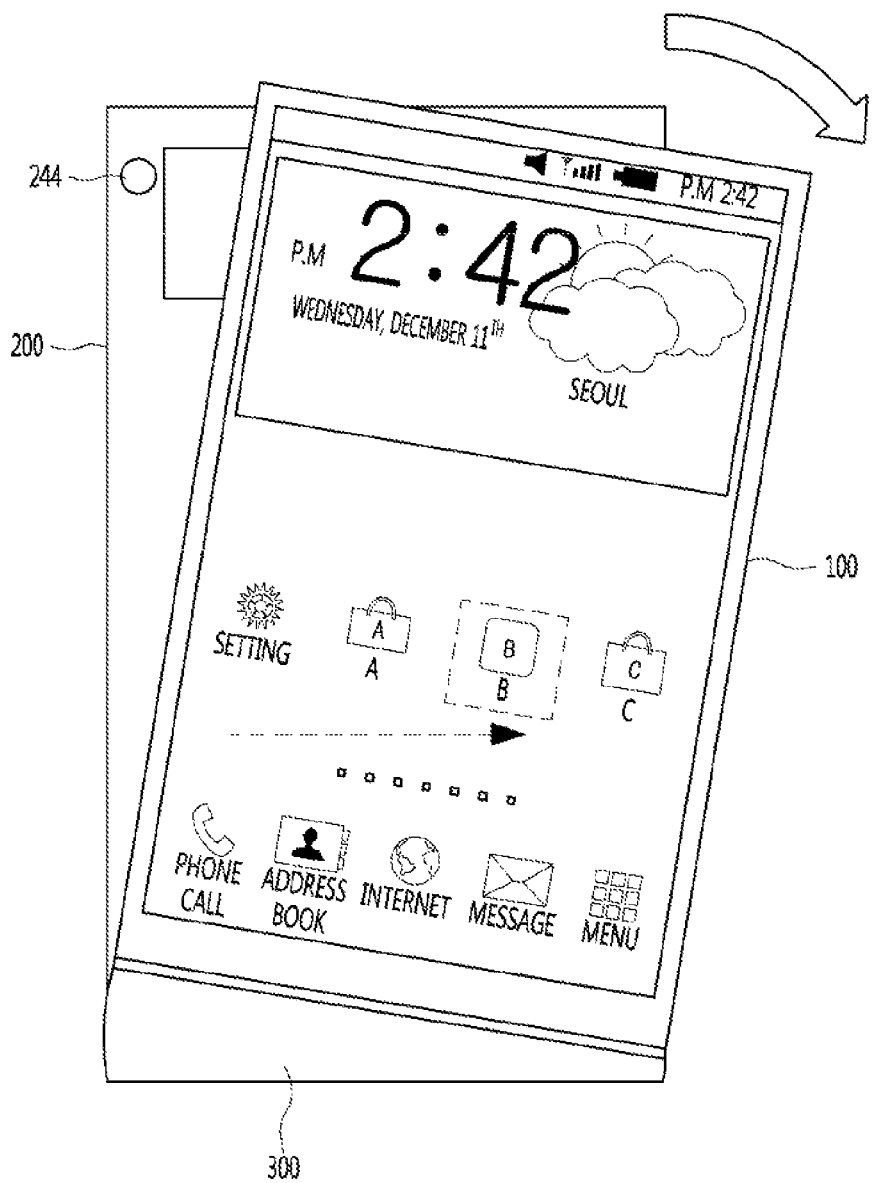
FIG. 20 is a view illustrating the home screen when the first body is moved rightward according to the embodiment of the present invention.

FIG. 18 is a view illustrating a home screen displayed on the mobile device according to the embodiment of the present invention, FIG. 19 is a view illustrating a home screen when the first body is moved to a left side according to the embodiment of the present invention, and FIG. 20 is a view illustrating a home screen when the first body is moved to a right side according to the embodiment of the present invention.

Referring to FIGS. 18 to 20, in the mobile device 1, as the first body 100 is moved to left and right sides of the second body 200, a selected icon may be changed.

When the first body 100 is moved to a left side of the second body 200, the first detection sensor 242 formed on the front surface of the second body 200 is exposed to the outside, and thus the control unit detects that the first body 100 is moved to the left side, by recognizing this fact.

Further, when the first body 100 is moved to a right side of the second body 200, the second detection sensor 244 formed on the front surface of the second body 200 is exposed to the outside, and thus the control unit detects that the first body 100 is moved to the right side, by recognizing this fact.

As an example, when any one of icons of the home screen is selected as illustrated in FIG. 18 and the first body 100 is moved relatively to the left side of the second body 200 as illustrated in FIG. 19, the selected icon is changed to a left icon.

Further, when the first body 100 is moved relatively to a right side of the second body 200 as illustrated in FIG. 20, the selected icon is changed to a right icon.

Thus, the user may simply and conveniently manipulate the screen through movements of the first body 100 and the second body 200 in addition to the touch.

The selected icon may be activated by pushing the button part 120.

Figure 21:
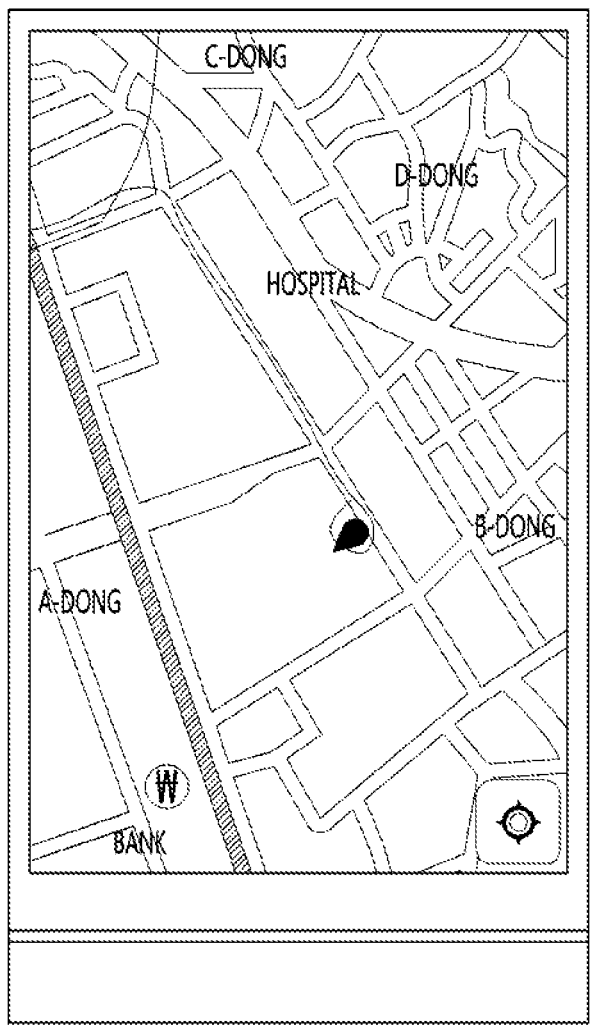
FIG. 21 is a view illustrating a map screen displayed on the mobile device according to the embodiment of the present invention.
Figure 22:
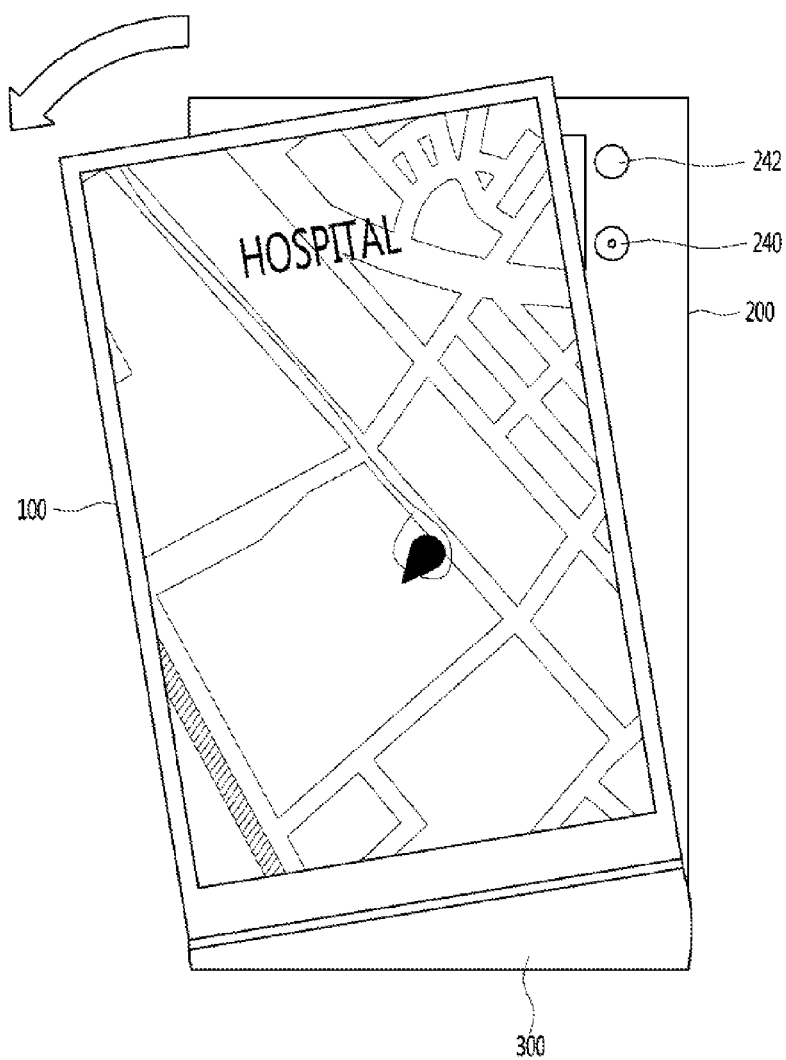
FIG. 22 is an enlarged view illustrating the map screen displayed on the mobile device according to the embodiment of the present invention.
Figure 23:
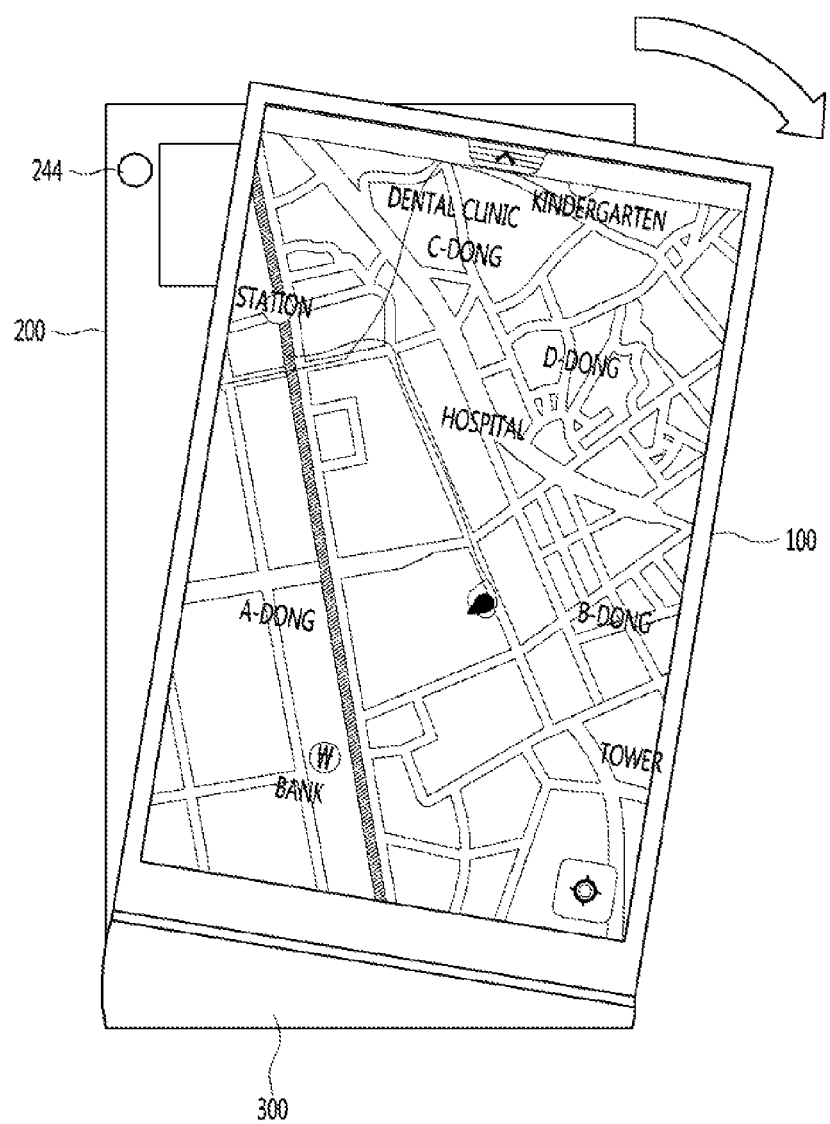
FIG. 23 is a reduced view illustrating the map screen displayed on the mobile device according to the embodiment of the present invention.

FIG. 21 is a view illustrating a map screen displayed on the mobile device according to the embodiment of the present invention, FIG. 22 is an enlarged view illustrating the map screen displayed on the mobile device according to the embodiment of the present invention, and FIG. 23 is a reduced view illustrating the map screen displayed on the mobile device according to the embodiment of the present invention.

Referring to FIGS. 21 to 23, in the mobile device 1, as the first body 100 is moved to left and right sides of the second body 200, the screen may be enlarged or reduced.

When the first body 100 is moved to a left side of the second body 200, the first detection sensor 242 formed on the front surface of the second body 200 is exposed to the outside, and thus the control unit detects that the first body 100 is moved to the left side, by recognizing this fact.

Further, when the first body 100 is moved to a right side of the second body 200, the second detection sensor 244 formed on the front surface of the second body 200 is exposed to the outside, and thus the control unit detects that the first body 100 is moved to the right side, by recognizing this fact.

As an example, as illustrated in FIG. 21, the map screen is output to the display unit 101, the user moves the first body 100 to the left side of the second body 200. The control unit detects that the first detection sensor 242 is exposed to the outside, and the map screen is enlarged as illustrated in FIG. 22. Here, a degree to which the map is enlarged is adjusted through a duration time for which a state in which the first body 100 is moved to a left side is maintained.

When the user moves the first body 100 to a right side of the second body 200, the control unit detects that the second detection sensor 244 is exposed to the outside, and the map screen is reduced as illustrated in FIG. 23. The degree to which the map is reduced is adjusted through a duration time for which a state in which the first body 100 is moved to a right side is maintained.

The invention claimed is:

1. A mobile device comprising:
   a first body having a display unit through which an image is output to one surface of the display unit;
   a second body spaced apart from the first body by a predetermined interval such that a substrate part, on which electronic elements are mounted, and a power source battery configured to supply electric power, are provided in the second body; and
   a connection member formed at lower ends of the first body and the second body to electrically connect the first body and the second body to each other;
   an auxiliary display unit formed on a front surface of the second body, which faces the rear surface of the first body, to output an image;
   a first camera mounted on one side edge of the auxiliary display unit;
   a first detection sensor provided at any one of a left edge and a right edge of the second body; and
   a second detection sensor provided at the other one of the left edge and the right edge of the second body,
   wherein a leftward movement or a rightward movement of the first body is detected by the first detection sensor and the second detection sensor, and
   wherein the connection member comprises:
      a body defining an outer appearance;
      installation parts provided on an upper surface of the body such that the first body and the second body are positioned on the installation parts, respectively;
      a flexible substrate arranged inside the body to electrically connect the first body and the second body to each other; and
      terminals formed at opposite ends of the flexible substrate, protruding toward outsides of the installation parts, and coupled to the first body and the second body, respectively.

2. The mobile device of claim 1, wherein the body is flexible such that the first body and the second body are movable in a direction in which they cross each other or in a direction in which they are parallel to each other.

3. The mobile device of claim 2, wherein the first camera is located on the second body and facing the first body, and
   wherein when the first body is relatively moved to a left side or a right side of the second body, a shooting mode is executed while the first camera is exposed.

4. The mobile device of claim 2, wherein when the first body is relatively moved to the left side of the second body, a cursor for selecting an icon displayed on the display unit is moved to the left side, and
   wherein when the first body is relatively moved to the right side of the second body, the cursor for selecting an icon is moved to the right side.

5. The mobile device of claim 2, wherein when the first body is relatively moved to the left side of the second body, a screen displayed on the display unit is enlarged, and
   wherein when the first body is relatively moved to the right side of the second body, the screen displayed on the display unit is reduced.

6. The mobile device of claim 1, further comprising a button part provided on a rear surface of the first body, which faces the second body, to receive a push input.

7. The mobile device of claim 1, wherein when the first camera is in a shooting mode, a distance between the mobile device and a subject is detected by a detection sensor, which is closer to the first camera, among the first detection sensor and the second detection sensor.

8. The mobile device of claim 1, further comprising a second camera provided on a rear surface of the second body to perform a shooting operation.

9. The mobile device of claim 1, further comprising an auxiliary module mounted on a space formed between the first body and the second body.

10. The mobile device of claim 9, wherein the auxiliary module is an electronic element installed in any one or both of the first body and the second body, and comprises a battery configured to supply electric power.

11. The mobile device of claim 10, further comprising a button part provided on a rear surface of the first body, which faces the second body, to receive a push input,
    wherein the auxiliary module comprises:
       an insertion groove formed on one surface of the battery such that the button part is inserted into the insertion groove;
       connection terminals provided at any point spaced apart from the insertion groove and electrically connected to the first body; and
       clips provided on the rear surface of the first body, which corresponds to locations of the connection terminals, to allow a current charged in the battery to be supplied to the first body by a contact with the connection terminals.

12. The mobile device of claim 9, wherein the auxiliary module comprises a speaker configured to output sounds transferred from any one or both of the first body and the second body.

13. The mobile device of claim 9, wherein the auxiliary module is a magnetic member having a magnet therein,
    wherein magnetic bodies are mounted in the first body and the second body, and
    wherein a state in which the first body and the second body are in close contact with the auxiliary module is maintained by an interaction between the magnetic bodies and the magnetic member.

14. The mobile device of claim 1, further comprising:
    a plurality of catching protrusions protruding from upper surfaces of the installation parts, and
    a plurality of catching grooves formed on bottom surfaces of the first body and the second body such that the plurality of catching protrusions are inserted into the plurality of catching grooves.

* * * * *